(12) United States Patent
Brochier et al.

(10) Patent No.: US 8,444,033 B2
(45) Date of Patent: May 21, 2013

(54) DEVICE FOR ATTACHING ACCESSORIES TO BARS, APPLICATION TO MOTOR VEHICLE ROOF RAIL BARS

(76) Inventors: Patrice Jean Marie Alain Brochier, Saint Privat des Vieux (FR); Christian Aime Charles Soteau, Vigneux sur Seine (FR)

( * ) Notice: Subject to any disclaimer, the term of this patent is extended or adjusted under 35 U.S.C. 154(b) by 278 days.

(21) Appl. No.: 12/920,127

(22) PCT Filed: Feb. 26, 2009

(86) PCT No.: PCT/FR2009/000213
§ 371 (c)(1),
(2), (4) Date: Aug. 30, 2010

(87) PCT Pub. No.: WO2009/115699
PCT Pub. Date: Sep. 24, 2009

(65) Prior Publication Data
US 2011/0309119 A1    Dec. 22, 2011

(30) Foreign Application Priority Data
Feb. 29, 2008  (FR) ..................................... 08 01125

(51) Int. Cl.
*B60R 9/04* (2006.01)
(52) U.S. Cl.
USPC ......................................... 224/319; 224/315
(58) Field of Classification Search
USPC ................. 224/309, 315, 319, 320, 321, 322, 224/325
See application file for complete search history.

(56) References Cited

U.S. PATENT DOCUMENTS

| | | | | |
|---|---|---|---|---|
| 2,480,353 A | * | 8/1949 | Bjork | 224/323 |
| 5,226,570 A | * | 7/1993 | Pedrini | 224/329 |
| 5,275,320 A | | 1/1994 | Duemmler | 224/319 |
| 5,758,810 A | | 6/1998 | Stapleton | 224/321 |
| 5,806,735 A | * | 9/1998 | Christiansson et al. | 224/322 |
| 5,845,828 A | * | 12/1998 | Settelmayer | 224/321 |

FOREIGN PATENT DOCUMENTS

| | | |
|---|---|---|
| EP | 0 503 305 B1 | 10/1994 |
| EP | 0894672 A1 | 7/1998 |
| FR | 2836432 A1 | 8/2003 |
| WO | WO 94/21490 | 3/1994 |

* cited by examiner

*Primary Examiner* — Justin Larson
(74) *Attorney, Agent, or Firm* — Steven M. War, Esq.

(57) ABSTRACT

A device for attaching accessories to a vehicle roof bar, the device comprising, a threaded control rod, two threaded nuts threaded onto the control rod, two guide bodies, wherein each of the guide bodies has one of the threaded nuts positioned within the guide body, a C-shaped rail, wherein each of the guide bodies and each of the threaded nuts are positioned within the C-shaped rail; two jaws, each of the jaws being attached to one of the guide bodies and a first portion of each jaw being located outside the C-shaped rail, whereby rotation of the control rod in a first direction causes the guide bodies to move towards each other thereby allowing a second portion of the jaws to contact the vehicle roof bar, and where further rotation of the control rod in the first direction locks the guide body within the C-shaped rail.

17 Claims, 4 Drawing Sheets

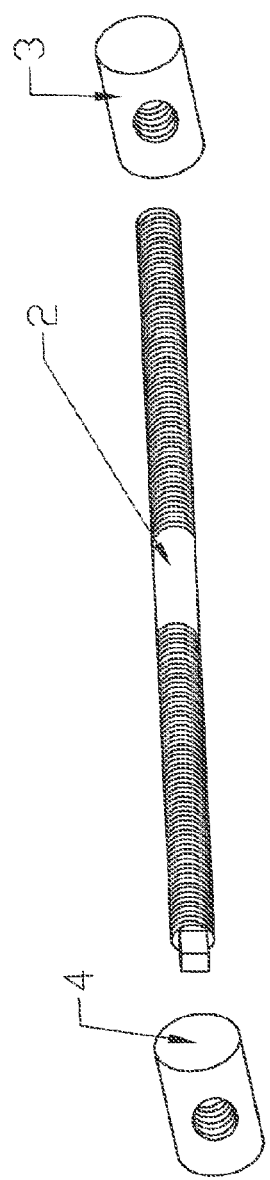

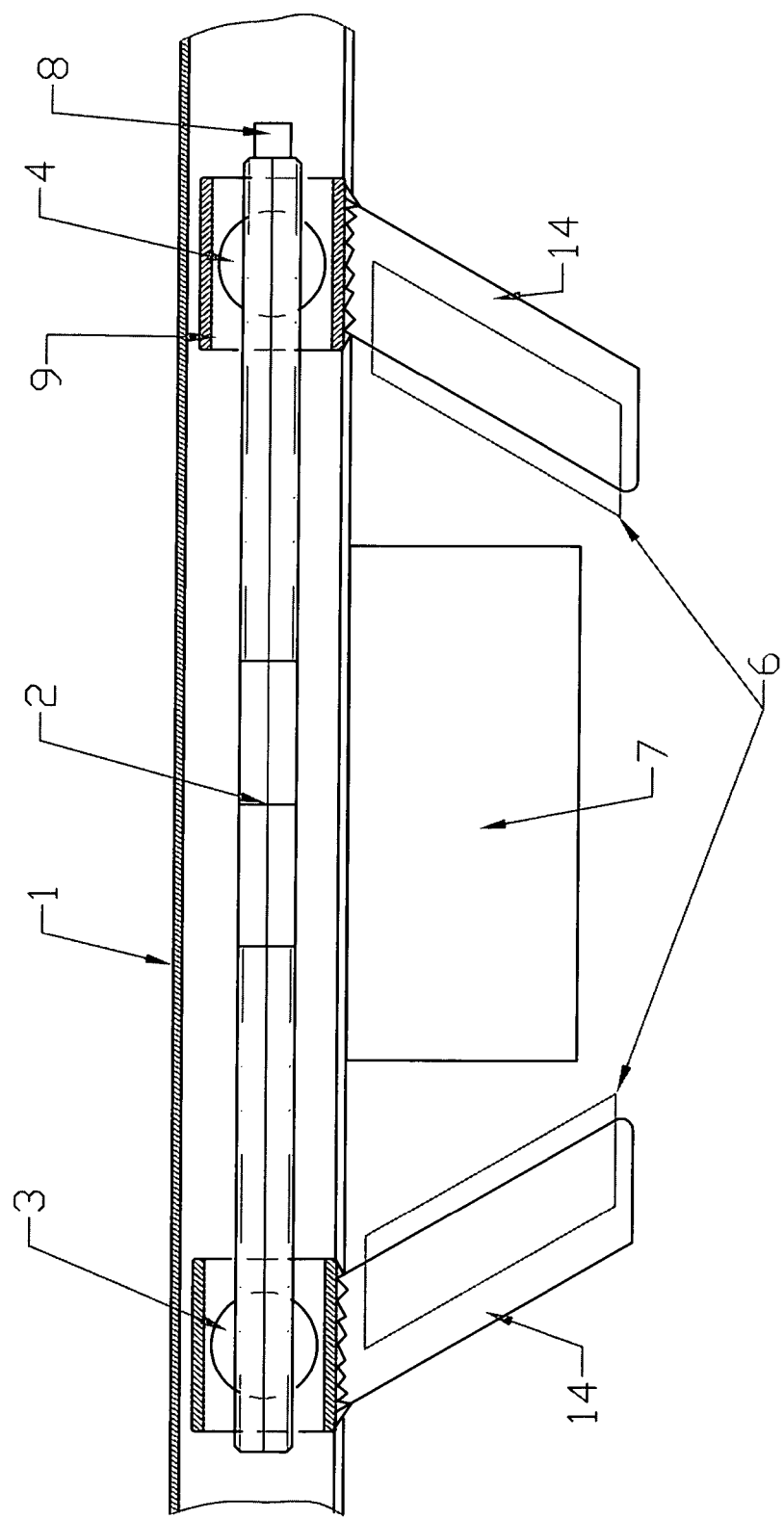

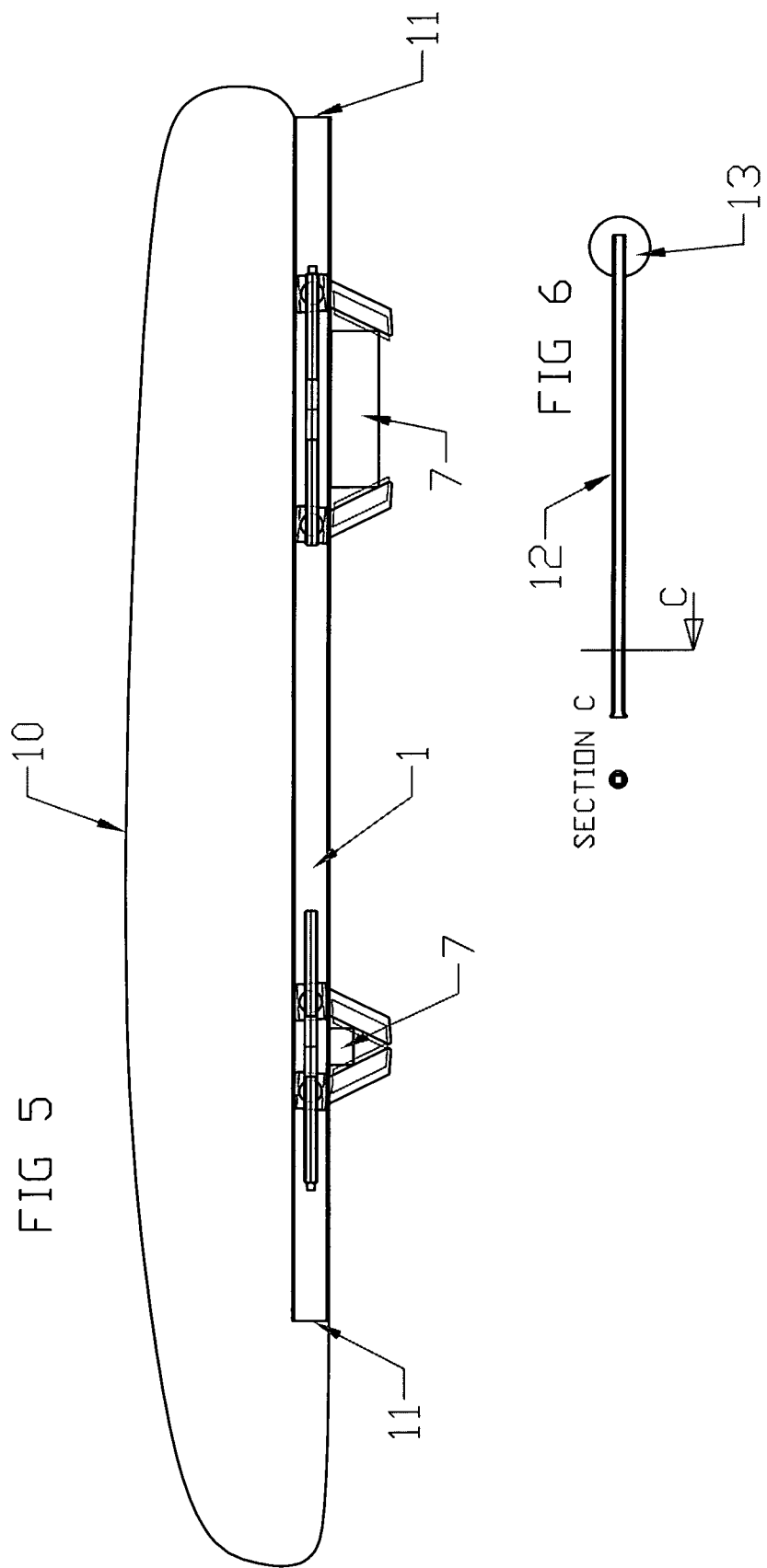

DEVICE FOR ATTACHING ACCESSORIES TO BARS, APPLICATION TO MOTOR VEHICLE ROOF RAIL BARS

This application claims priority to International Patent Application No. PCT/FR2009/000213 (published as WO 2009/115699) with an international filing date of Feb. 26, 2009, which claims priority to FR 08/01125 filed on Feb. 29, 2008, the contents of which are incorporated herein in their entirety by reference.

FIELD OF THE INVENTION

The invention relates to a device for fixing an accessory to one or several bars and its application as part of a device for attaching a transversal or longitudinal vehicle transportation accessory, such as a roof box, roof tent, roof rack, etc., to the roof bars of a motor vehicle.

BACKGROUND OF THE INVENTION

There are currently various systems for attaching a transportation accessory such as a roof box, an automobile roof tent or a roof rack to a vehicle's roof bars.

To attach an accessory such as a roof box, there are fast and anti-theft systems such as patent FR2836432, accessible only from inside the roof box.

However, to access it the user is required to reach the device located high up on top of the vehicle and in addition inside the roof box, which is difficult in the case of large vehicles.

Furthermore, the system takes up room inside the roof box, making loading more difficult and it is not possible to use this system in the case of a tent roof, where the floor must be absolutely flat for sleeping on.

Finally, the system is limited in terms of the width of the bars on which it can be fixed, which currently can cause problems with very wide wing-shaped bars.

There are other systems, used mostly for fixing transverse bars onto longitudinal bars, such as EP0894672, but they are difficult to use in the case of roof boxes and roof racks on transversal bars since it is difficult to gain access between the vehicle's roof and the roof box or rack.

Moreover, these systems do not have a usage range capable of gripping both very thin and very wide bars.

Finally, these systems include a large number of parts, which has an impact on the manufacturing cost.

Another such system is described in patent WO 94/21490, which uses a wedge system for tightening in all positions.

In this known device, a screw in the channel axis of the bar (or rail) tightens two identical grips.

The outer side of the grip is angled at about 60° and has a hole for the hexagon screw.

A 60° wedge is threaded to hold the screw and acts in the system as a nut.

A compression spring between the grips allows the lock to be preloaded using a small amount of force, enabling the system to be moved by pressing the wedge.

This system has some drawbacks, such as the wedge effect which relies on the screw and the angle of the wedge: there is a contradiction between the clamping force of the grips and the locking force of the wedges.

Depending on the wedge angle, one of the two forces will increase and the other decrease, although both are equally important.

Moreover, if the screw breaks, there is no longer any fastening effect, which may endanger the security of the load.

Finally, the screw is pulled by the thread which moves radially under the wedge effect and is already pulled by its head, in the bore of the other grip, thereby pulling the screw in two directions and exposing it to additional mechanical stress, which must be avoided (risk of it breaking).

There are also very traditional fixing systems using flanges (of various shapes), which are not easy to use since they involve the tightening of nuts (or bolts) where the load rests on the bar, usually between the vehicle roof and the load, which has poor access and little room for the movements required. In addition, since the height of the bars from the vehicle roof varies widely from one vehicle to another, it is not uncommon for screws to be too close to the vehicle roof or even touch it, rendering the system unusable. Finally, these systems are not anti-theft.

SUMMARY OF THE INVENTION

The purpose of the present invention overcomes these disadvantages in that the device, comprising a grip assembly sliding along a rail, moves easily to the required location (depending on the gauge of roof bars), grips bars of all widths, self-centers and self-locks on both sides of the bar, therefore gripping it strongly without requiring a lot of effort from the user, remains locked in the event of failure of the control rod, is handled externally (does not encumber the inside of a roof box or floor of a roof tent), is anti-theft, is easy to access, is easy to untighten and contains few parts, which are simple and inexpensive to produce.

The device is based on the wedging and bracing effect experienced in mechanics to lock an object moving along a slide.

Points for consideration:

Two objects moving freely along the rail are called guiding bodies and are each equipped with a part coming out of the rail, which will be used as a jaw, The dry friction coefficient between the rail and the guide body is equal to or greater than 0.25, corresponding to the raw, dry metal surfaces of these parts.

Twice the length of the guide body is at least equal to or less than half the height of the rail added to the distance between the rail and the bar's point of contact with the jaw.

These guiding bodies are bored in their center

A guide nut is fitted in each of these bores

The nuts are threaded, one to the right, one to the left

One end of a control rod, threaded to the right, is screwed into the nut threaded to the right, and its other end, threaded to the left, into the nut threaded to the left.

This rod therefore moves the guiding bodies in translation, moving them further apart or closer to each other, depending on the direction in which it is screwed All of these pieces are integral, forming a grip which moves freely along the rail.

This produces a surprising result if a bar is set between the two jaws of the clamp and the control rod is screwed in such a way that the jaws of the clamp come closer:

When one of the jaws comes into contact with the bar and screwing continues, the other jaw then comes closer, self-centering the clamp on the bar until both jaws come into contact with the bar By continuing to screw, the locking of the jaw against the bar leads to the guide body rotating and wedging in the rail, causing the rail and the bar to become completely fastened together in every direction of movement, permitting the transmission of forces and torques consistent with their intended use.

Also, due to the size of the guide body in relation to the rail and the point of contact of the jaw, the guide body is locked by bracing, and so even if the rod breaks, the guide bodies would remain locked and so the clamp would remain on the bar Simply turn the control rod in the opposite direction to unlock one of two guide bodies, thereby opening the clamp and releasing the bar. If this is not done, the clamp does not open and the guide bodies remains locked, gripping the bar.

The clamping forces are magnified to such an extent that when the control rod is turned, the wedging forces exerted on the guide bodies are much greater.

An accessory can therefore be fixed on one or more bars using this device, comprising the elements set out above.

The invention will be better understood by reading the following description and examining the accompanying figures. These are presented for illustrative purposes and in no way limit the invention.

BRIEF DESCRIPTION OF THE DRAWINGS

The accompanying drawings, which are incorporated in and form a part of the specification, illustrate embodiments of the invention and, together with the description, serve to explain the principles of the invention.

FIG. 1 shows the elements of this invention's clamp sub-assembly

FIG. 2 shows the invention's clamp sub-assembly on a rail (1)

FIG. 5 shows an overview of a roof box fitted with the system and two roof bars (7)

FIG. 6 shows the special tool for mounting/removal (12)

DETAILED DESCRIPTION OF THE PREFERRED EMBODIMENT

Figure 4:
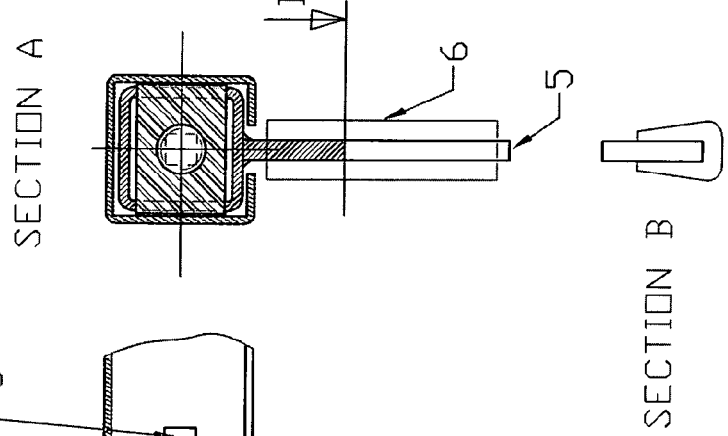
FIG. 4 shows section A of FIG. 3

Application of the device for attaching accessories to vehicle roof bars is described below.

This device is used for the quick, easy and safe attachment of motor vehicle transportation accessories such as roof boxes (10), roof tents, bicycle racks, roof racks, etc., to vehicles' roof bars.

The device for fastening accessories to the vehicle roof bars consists of a C-shaped rail (1), or open tube, and one or more grips (5), including a guide body (9) which moves along the rail (1) and a jaw (14) external to the rail (1) and is characterized by the guide body (9) being bored in its center to receive a ball or a threaded nut (3) which articulates in the bore and is driven in translation by a threaded control rod (2). The locking of the jaws (14) against the bar (7) in this translation leads to rotation of the guide body (9) and its wedging in the rail (1).

The dry friction coefficient between the rail and the guide body is equal to or greater than 0.25, corresponding to these parts' raw and dry metal surfaces. Twice the length of the guide body (9) is at least equal or less than half the height of the rail (1) added to the distance between the rail (1) and the contact point of the bar (7) with the jaws (14), in order to brace the guide bodies (9) in the rail (1).

The bracing of the guide bodies (9) in the rail allows the grips (5) to remain locked in the event the control rod (2) breaks, thereby ensuring the secure attachment of the load to the roof bars (7).

Two grips (5), arranged symmetrically in the rail (1) and connected by the control rod (2), which is threaded on one end to the right to screw into the grip's nut threaded to the right (3) and on the other threaded to the left to screw into the other grip's left threaded nut (4), form a clamp, with the grips (5) closing together along the control rod (2) when it is rotated in one direction (e.g. to the right), causing self-centering as a result of the successive contact of the two grips (14) against the roof bar (7) and finally the tightening of the jaws (14) on the bar 7 when both come into contact with the bar (7) thereby fastening the rail (1) to the roof bar through wedging of the guide bodies (9) in the rail (1). It is impossible for these guide bodies (9) to be released and the entire clamp to open unless the control rod (2) is rotated in the opposite direction.

This fastening in all directions of movement allows the transmission of forces and torques in all directions, consistent with the intended use.

The movement of the threaded nuts (3 and 4) away from each other all along the control rod (2) when it is turned to the left causes the movement of the guide body (9), thereby causing the release of the grips (5) from the rail (1) by disabling the bracing and the movement of the jaws away from each other.

The jaws (14) of the grips (5) are covered in an elastic material (6) whose compression ensures a constant force on the guide bodies (9) and thereby maintains the bracing effect, for instance in the event of strong vibration.

The C-rail (1) has an opening to allow insertion or removal of one or more clamp assemblies, without the need for tools.

The C-rail (1) is open along its entire length so that clamp assemblies can be positioned at all gauges of roof rails, which vary from one vehicle to another.

The threaded portions of the control rod (2) are longer than 50 mm to fit any width of roof bars, both traditional square and rectangular bars and also aerodynamic wing-shaped bars, which are wider than average, and could therefore cause problems for other mounting systems.

The clamp assemblies are easily interchangeable without any tools, by dragging the whole clamp towards the opening of a rail (1) by hand, which can be cut-out from the wings anywhere on the C-rail (1), or be located at the end (11) of the rail (1).

One way of fitting the invention would be:

Two rails (1) are attached to a roof box (10). They are C shaped (FIG. 4).

Figure 3:
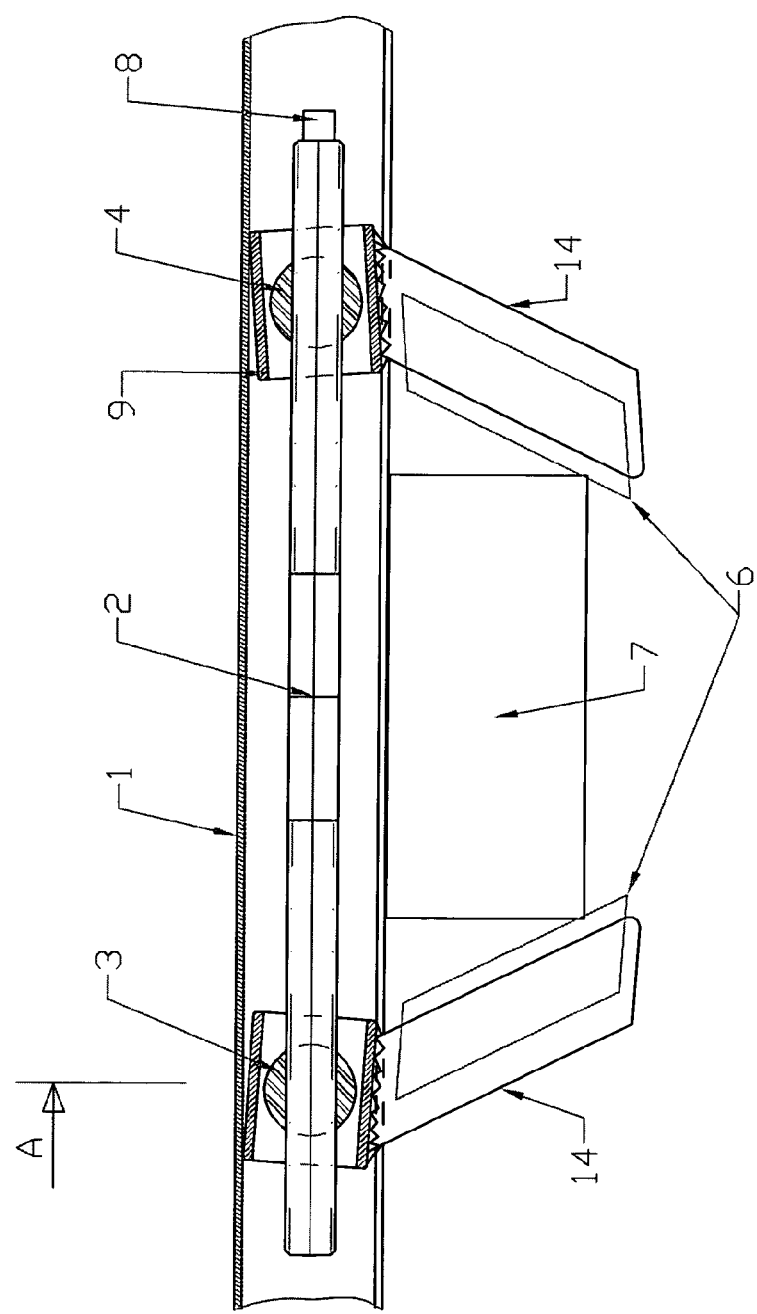
FIG. 3 shows the clamp sub-assembly when tightened on a roof bar (7), with the guide bodies (9) then braced on the rail (1)

Eight identical grips (5), each having a jaw part (14) and a guide body part (9) are manufactured according to FIGS. 1, 3 and 4. They may be welded or molded.

The length of the guide body (9) depends on the size of its section (e.g. 30 for a square section of 25). The jaw (14) may be covered in elastic material (6).

Eight cylindrical nuts are manufactured identically, except for the threading, which is to the right for four nuts (3) and to the left for four nuts (4).

Four control rods (2) are manufactured with one end threaded to the right and the other threaded to the left. On the latter a control block (8) is machined.

A special tool (12) is manufactured from a square tube in the shape of a funnel to improve the centering of the tool. On the control side, a plastic knob (13) with a square shape molded into it could be fitted.

To summarize how the invention functions:

The clamp assemblies move freely along the rails.

1. When the control rod (2) is turned to the right, the clamp closes, turned to the left the clamp opens.

The clamps self-center and tighten around the roof bars (7), attaching the C-rail (1) to the roof bar (7).

The clamp assemblies are easy to change without tools and inexpensive to manufacture since the assembly has few parts.

The tightening clamps are controlled from the end of the C-rails (1). The user can tighten or untighten them using the special tool (12) which operates the control rod (2). The special tool (12) the same size as the control rod's control block (8) is therefore required to open or close the clamp's grips (5). Unlocking is not possible without this tool. Moreover, if one of the ends of the rail (1) is secured, as may be the case for a roof tent or a roof box, the system is doubly anti-theft.

To mount it, the user prepositions the clamp assembly by hand, placing the roof bar (7) between the clamp's two open grips (5). The user then screws the control rod (2) using the special tool (12). One of the grips (5) will come into contact with a roof bar and the opposite grip (5) will move and close the system by tightening firmly on the roof bar (7). The guide bodies (9) lock in the rail (1) through a bracing effect.

To remove it, the user unscrews the control rod (2) using the special tool (12) and the grips (5) are released, since they are pushed away from the axis of the rail by the threaded nuts (3 and 4).

The foregoing descriptions of specific embodiments of the present invention have been presented for the purposes of illustration and description. They are not intended to be exhaustive or to limit the invention to the precise forms disclosed, and it should be understood that many modifications and variations are possible in light of the above teaching.

The invention claimed is:

1. Device for attaching accessories to vehicle roof bars, comprising: a C-shaped rail and at least two grips, each of said grips including a guide body and a jaw where said guide bodies move within said rail, each of said guide bodies being attached to a respective jaw external to the rail, wherein each guide body includes a threaded nut positioned approximately within the center of said guide body, said threaded nut threaded onto a threaded control rod, whereby rotating said threaded control rod in a first direction causes said guide bodies to move toward one another and further rotation of said control rod in said first direction causes at least one of said jaws to make contact with said vehicle roof bar thereby causing a rotation of the guide body such that said rotated guide body becomes wedged in said rail.

2. Device as per claim 1, including two grips, arranged symmetrically in the rail and connected by the control rod, said control rod being threaded on one end to the right to screw into the grip's nut threaded to the right and on the other threaded end to the left to screw into the other grip's left threaded nut, forming a clamp, with the grips closing together along the control rod when it is rotated in said first direction, causing self-centering as a result of the successive contact of the two grips against the roof bar and further rotation of said control rod thereby fastening the rail to the roof bar through wedging of the guide bodies in the rail making it impossible for these guide bodies to be released and the entire clamp to open unless the control rod is rotated in a direction which is opposite said first direction.

3. Device as per claim 1, wherein the dry friction coefficient between the rail and the guide body is equal to or greater than 0.25, corresponding to these parts' raw and dry metal surfaces and that twice the length of the guide body is at least equal or less than half the height of the rail added to the distance between the rail and the contact point of the bar with the jaws, in order to brace the guide bodies in the rail.

4. Device as per claim 3, wherein the bracing of the guide bodies in the rail allows the grips to remain locked in the event the control rod breaks.

5. Device as per claim 1, wherein the jaws of the grips are covered in an elastic material whose compression ensures a constant force on the guide bodies and thereby maintains the bracing effect.

6. Device as per claim 1, wherein the rail has an opening to allow insertion or removal of one or more clamp assemblies, without the need for tools.

7. Device as per claim 1, wherein the rail is open along its entire length so that clamp assemblies can be positioned at all gauges of roof rails, which vary from one vehicle to another.

8. Device as per claim 1, wherein the device is used for the quick, easy and safe attachment of motor vehicle transportation accessories such as roof boxes, roof tents, bicycle racks, roof racks, etc., to vehicles' roof bars.

9. Device as per claim 1, wherein the threaded portions of the control rod are longer than 50 mm to fit any width of roof bars.

10. A device for attaching accessories to a vehicle roof bar, said device comprising:
   a threaded control rod;
   two threaded nuts threaded onto said control rod;
   two guide bodies, wherein each of said guide bodies has one of said threaded nuts positioned within said guide body;
   a C-shaped rail, wherein each of said guide bodies and each of said threaded nuts are positioned within said C-shaped rail;
   two jaws, each of said jaws being attached to one of said guide bodies and a first portion of each of said jaws being located outside of said C-shaped rail;
   whereby rotation of the threaded control rod in a first direction causes said guide bodies to move towards each other thereby allowing a second portion of said jaws to contact said vehicle roof bar;
   wherein contact between said second portion of said jaw and said vehicle roof bar causes said guide body to rotate within said C-shaped rail; and
   where further rotation of the threaded control rod in said first direction permits the jaws to grip said vehicle roof bar.

11. The device of claim 10 wherein a portion of said threaded control rod has a left-handed thread and a portion of said threaded control rod has a right-handed thread.

12. The device of claim 10 wherein said C-shaped rail is an open tube.

13. The device of claim 10 wherein rotation of said threaded control rod in a second direction causes said guide bodies to move away from each other.

14. The device of claim 10 wherein a third portion of said jaws further includes an elastic material to maintain a bracing effect between said guide bodies and said C-shaped rail.

15. The device of claim 10, wherein the threaded portions of the control rod are longer than 50 mm.

16. The device of claim 10, wherein the dry friction coefficient between the C-shaped rail and the guide bodies is equal to or greater than 0.25, corresponding to these parts' raw and dry metal surfaces and that twice the length of the guide body is at least equal or less than half the height of the rail added to the distance between the rail and the contact point of the bar with the jaws, in order to brace the guide bodies in the C-shaped rail.

17. A device for attaching accessories to a vehicle roof bar, said device comprising:
   a threaded control rod;
   two guide bodies, means for moving said guide bodies along said threaded control rod towards each other;

a C-shaped rail, wherein each of said guide bodies are positioned within said C-shaped rail;
means to rotate said guide bodies within said C-shaped rail;
two jaws, each of said jaws being attached to one of said guide bodies and a first portion of each of said jaws being located outside of said C-shaped rail; and
means for locking said guide bodies in said C-shaped rail.

\* \* \* \* \*